United States Patent [19]

Kimura

[11] Patent Number: 5,052,698
[45] Date of Patent: Oct. 1, 1991

[54] TWO-PIECE TYPE OIL RING ASSEMBLY

[75] Inventor: Tsutomu Kimura, Kumagaya, Japan

[73] Assignee: Nippon Piston Ring Co., Ltd., Tokyo, Japan

[21] Appl. No.: 579,097

[22] Filed: Sep. 7, 1990

Related U.S. Application Data

[63] Continuation of Ser. No. 284,664, Dec. 15, 1988, abandoned.

[30] Foreign Application Priority Data

Dec. 17, 1987 [JP] Japan ................................. 62-317422

[51] Int. Cl.[5] ................................................. F16J 9/06
[52] U.S. Cl. ..................................... 277/138; 277/215; 277/216
[58] Field of Search ................... 92/182; 277/216, 141; 267/1.5

[56] References Cited

U.S. PATENT DOCUMENTS

| 3,004,811 | 10/1961 | Mayfield | 277/139 |
|---|---|---|---|
| 3,261,612 | 7/1966 | Games | 277/140 |
| 3,442,519 | 5/1969 | Hamm et al. | 277/140 |
| 3,738,668 | 6/1973 | Minegishi | 277/41 |
| 3,768,818 | 10/1973 | Minegishi | 277/139 x |
| 4,194,747 | 3/1980 | Nisper | 277/140 |
| 4,629,198 | 12/1986 | Morsbach et al. | 277/139 |

FOREIGN PATENT DOCUMENTS 2615010 10/1977 Fed. Rep. of Germany ...... 277/140

Primary Examiner—Allan N. Shoap

[57] ABSTRACT

A two-piece type oil ring assembly consisting of a single spacer expander in the form of a split annulus and a side rail in the form of a flat split annulus. The spacer expander has a flat lower surface for making plane contact with the lower side of an oil ring groove when the assembly is mounted in the oil groove of a piston. The spacer expander has a radially, substantially L-shaped section composed of a trough portion, an outer crest portion integrally connected to the trough portion from outside, and an inner crest portion integrally connected to the trough portion from inside, the inner crest portion being taller than the outer crest portion. The spacer expander has a multiplicity of radial slots extending alternatively from the inner periphery of the inner crest portion to the inner periphery of the outer crest portion and from the outer periphery of the outer crest portion to the outer periphery of the inner crest portion. A plurality of oil grooves pass radially through the spacer expander. The lower surface of the side rail is placed on the outer crest portion while the inner periphery of the side rail is supported by the slanting surface of the inner crest portion.

8 Claims, 1 Drawing Sheet

TWO-PIECE TYPE OIL RING ASSEMBLY

This application is a continuation, of application Ser. No. 07/284,664 filed Dec. 15, 1988, now abandoned.

BACKGROUND OF THE INVENTION

1. Field of the Invention

The present invention relates to a two-piece type oil ring assembly fitted in an oil ring groove which is formed in a peripheral side of a piston for the control of lubricating oil in an internal combustion engine.

2. Description of the Prior Art

In general, an oil ring assembly for the control of lubricating oil in an internal combustion engine is of a type having a spacer expander and a pair of side rails, as illustrated in JP B 33-10104 corresponding to U.S. Pat. No. 2,789,872. The three-piece type oil ring assembly has many disadvantages one of which is that three pieces is too much in number to be assembled without introducing a mistake into the assembly. Each of the upper and lower side rails is required to move independently from the other and tightly follow the inner surface of an engine cylinder. When, upon the inclination of the piston, one of the upper and lower side rails strongly pushes a part of the spacer expander inwardly, the spacer expander is displaced inwardly to permit the separation of the outer end of the other side rail from the inner surface of the cylinder, resulting in another disadvantage in that the reduction in the oil scraping effect causes a problem of excessive oil consumption. Recently, there is the desire that he engine for use in vehicles has a reduced weight. This leads to the requirement that the piston, as well as the oil ring assembly, should be axially shorter than usual However, it is impossible to effectively shorten the axial length of the three-piece oil ring assembly.

There are disclosed two-piece type oil ring assemblies: each consisting of a single spacer expander and a single side rail shown in JP A 52-122713 corresponding to DE P 2615010.7 and JP U 55-41502. The oil ring assembly as shown in JP A 52-122713 comprises a spacer expander having a U-shaped radial section of which the axial length is similar to that of the aforementioned three-piece type oil assembly The sectional U-shaped spacer expander, made of a thin steel strip, has an insufficient force to support the inner periphery of the side rail with the result that it is easily affected by the inclination of the piston permitting the separation of the side rail from the cylinder wall. This leads to a reduction of the oil scraping effect The oil ring assembly as shown in JP U 55-41502 comprises a spacer expander having a radially crescent bottom which is unstably seated on the lower side of the oil ring groove The unsteadiness of the spacer expander results in the disadvantages that the sealing of the lower side of the oil groove is unreliable and that the spacer expander is easily affected by the inclination of the piston to permit the separation of the side rail from the cylinder wall

SUMMARY OF THE INVENTION

It is, therefore, a major object of the present invention to provide an improved two-piece type oil ring assembly in which the spacer expander is always steady in an oil ring groove and has a sufficient force to press the side rail both against the upper side of the oil ring groove and against the inner surface of an engine cylinder.

It is another object of the present invention to provide an improved two-piece type oil ring assembly that is relatively short in axial length and less in mass.

It is still another object of the present invention to provide an improved two-piece type oil ring assembly that is less affected by the inclination of the piston.

It is a further object of the present invention to provide an improved two-piece type oil ring assembly in which oil is expedited to return from the oil ring groove to the crank case.

According to the present invention, the two-piece type oil ring assembly is composed of a single side rail and a single spacer expander. The spacer expander is generally formed into a split annulus of which the flat bottom makes a plane contact with the lower side of the oil ring groove when it is mounted in the oil ring groove. The spacer expander has a somewhat L-shaped section composed of a trough portion, an outer crest portion integrally connected to the trough portion from outside, and an inner crest portion integrally connected to the trough portion from inside. The inner crest portion is axially longer than the outer crest portion. The spacer expander has a multiplicity of radial slots extending alternatively from the outer and inner peripheries through the trough portion, whereby two adjacent trough portions are connected with the intervention of an inner crest portion therebetween to form a radial undulation, and whereby the adjacent undulations are connected with the intervention of the outer crest portion therebetween to form the aforementioned split annulus. There are provided a plurality of oil grooves passing radially through the spacer expander. The side rail is formed into a split annulus of which the upper and lower surfaces are flat. The lower surface and the inner periphery of the side rail are respectively supported by the outer and inner crest portions of the spacer expander. The inner periphery of the side rail is preferably supported by the outer slanting surface formed on the inner crest portion.

Due to the plane contact between the flat bottom of the spacer expander and the lower side of the oil ring groove, the spacer expander is steady and stable in position in the oil ring groove to support the side rail. The outer and inner crest portions press the side rail both against the upper side of the oil ring groove and against the inner surface of the cylinder to cause the side rail to seal the upper side of the oil ring groove and scrape off oil from the inner surface of the cylinder. The oil, after being scraped from the cylinder by the side rail, quickly returns through the oil grooves in the spacer expander to the crank case.

The advantages offered by the invention are mainly that the oil ring assembly contributes to reducing the weight of the engine because it is short in length and has less weight. It is also followable with high speed reciprocation of the piston because it has a small inertia force due to its own mass, and is less affected by the inclination of the piston and allows the spacer expander to stably support the side rail, thereby sealing the opposite sides of the oil ring groove as well as the inner surface of the cylinder. It is also easily assembled without introducing a mistake into the system, and also it facilitates the return of oil into the crank case. All in all, the oil ring assembly is superior in the control of lubricating oil in high speed engines.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE PREFERRED EMBODIMENTS

Figure 1:
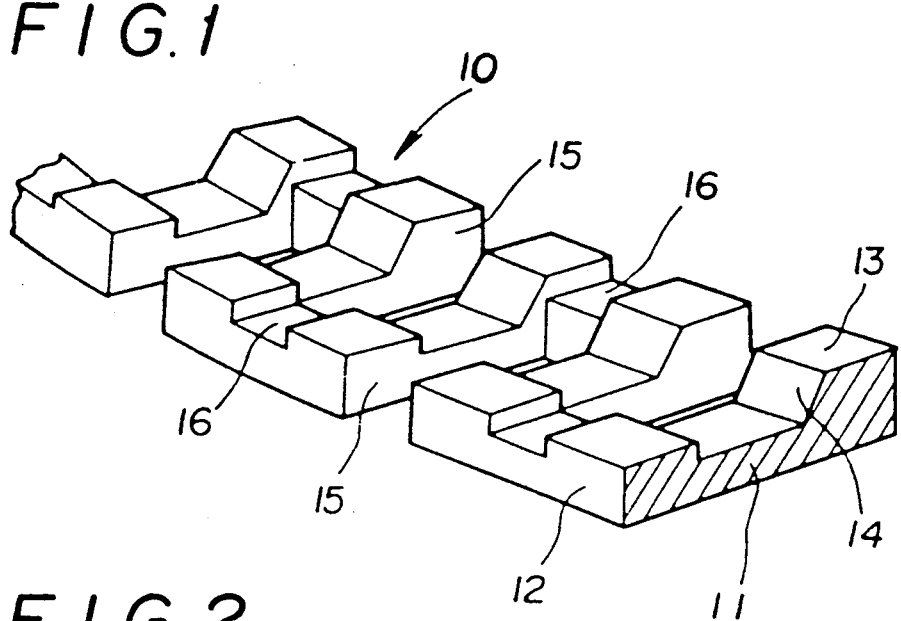
FIG. 1 is an enlarged fragmentary perspective view of the spacer expander according to the present invention.
Figure 3:
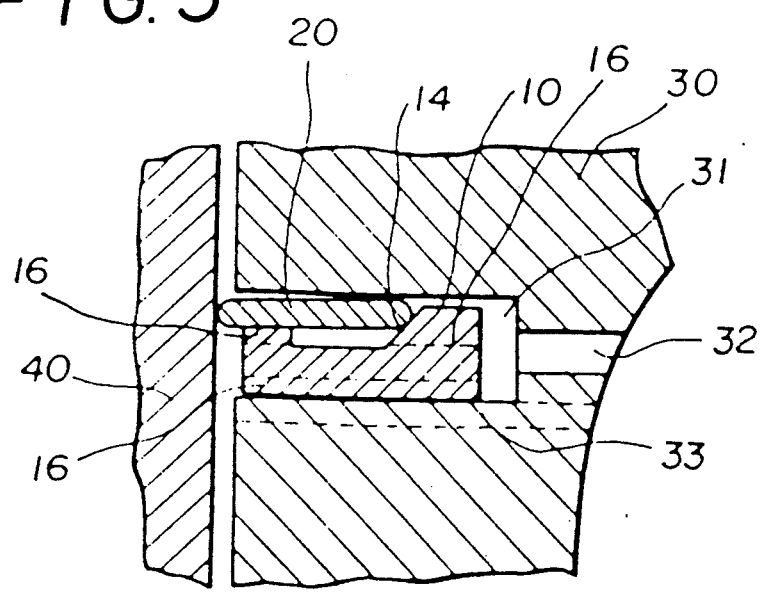
FIG. 3 is an enlarged sectional view of the oil ring assembly mounted in the engine, illustrating the relationship of the spacer expander of FIG. 1 to the side rail, the oil ring groove in the piston and the cylinder.

Referring now to FIG. 1, the spacer expander 10 has a somewhat L-shaped radial section composed of a trough portion 11, an outer crest portion 12 integrally connected to the trough portion from the outside, and an inner crest portion 13 integrally connected to the trough portion from the inside. The inner crest portion 13 is taller than the outer crest portion 12 by a length similar to the axial length of the side rail, which is shown in FIG. 3. The inner crest portion 13 is formed with an outer slanting surface 14 which has an inclination angle of 70 to 75 degrees to the horizontal plane or the lower surface of the spacer expander 10. The slanting surface 14 faces radially outwardly.

When the spacer expander 10 is viewed vertically or along its axial direction, a single radial undulation is formed by two adjacent trough portions 11 and 11 and an inner crest portion 13. A radial undulation is successively connected to the other adjacent radial undulation with the intervention of the outer crest portion 12 therebetween to form a split annular construction as a whole. The spacer expander 10 has an abutting portion like a usual piston ring. This reaches the same result since the spacer expander 10 has a multiplicity of radial slots 15 extending alternatively from the outer periphery of the outer crest portion 12 to the outer periphery of the inner crest portion 13 and from the inner periphery of the inner crest portion 13 to the inner periphery of the outer crest portion 12. The slots 15 allow the spacer expander 10 to be more resilient and followable with the cylinder wall, even if the cylinder wall is deformed The slots 15 are also useful as a passage for draining oil.

Figure 2:
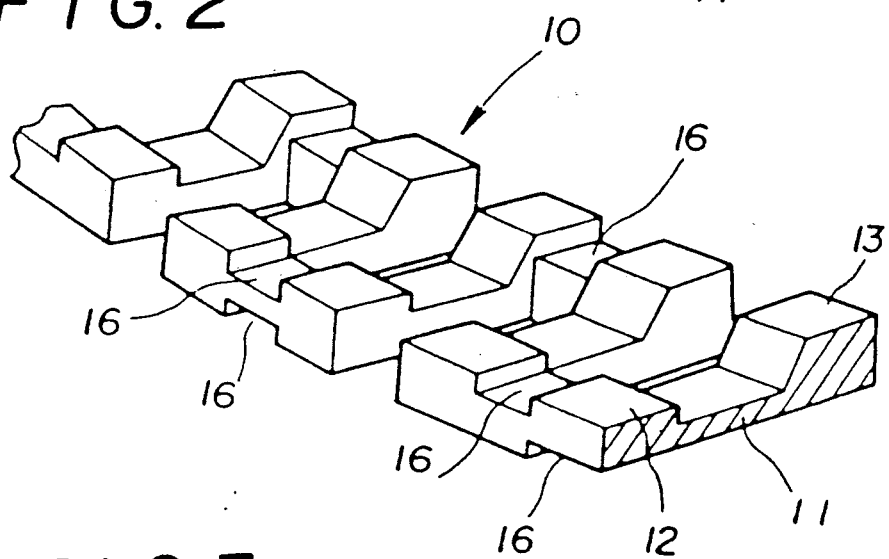
FIG. 2 is a view of another embodiment, similar to FIG. 1.

The spacer expander 10 is provided with oil grooves 16 radially passing through the upper surfaces of the outer and inner crest portions 12 and 13. Oil is scraped off from the cylinder wall and drained radially through the oil grooves 16 to the inside of the piston. The spacer expander 10 as shown in FIG. 1 has only oil grooves 16 formed on the upper surfaces of the outer and inner crest portions 12 and 13. As seen in FIG. 2, the oil grooves 16 can be provided in the upper and lower surfaces of outer and inner crest portions 12 and 13 of the spacer expander 10 as well as in the common lower surface of the the trough portion 11 and the outer and inner crest portions 12 and 13. More oil is drainable in the embodiment of FIG. 2 than in the previous one. Oil drainage is adjusted by the number and position of the oil grooves 16.

Referring to FIG. 3, the oil ring assembly consists of a single spacer expander 10 and a single side rail 20 in the form of a split annulus which is disposed on the spacer expander. The oil ring assembly is easily set up without mistake and mounted in an oil ring groove 31 which is formed in the piston 30. The side rail 20 is supported by the spacer expander 10 in a manner that it has the lower surface placed on the outer crest portion and the inner periphery pressed by the outer slanting surface 14 of the inner crest portion against the upper side of the oil ring groove 31 and the inner surface of the cylinder 40. The spacer expander 10 and the side rail 20 can be made from a steel wire or the like at a low cost since they are very thin in width. The oil ring assembly has both the axial height and the radial length reduced to lighten its own weight and decrease its inertia force.

The spacer expander 10 is stably seated in the oil ring groove 31 because its flat lower surface makes a plane contact with the lower side of the oil ring groove 31. This means that the spacer expander 10 is less affected even if the piston 30 is inclined to the cylinder 40 during high speed operations. It can also exert a strong force to push the side rail 20 both against the upper side of the oil ring groove 31 and against the inner surface of the cylinder 40. The strong force and steadiness of the spacer expander 10 prevent the separation of the side rail 20 both from the lower side of the oil ring groove 31 and the inner surface of the cylinder 40 during high speed operations. Therefore, the side rail 20 is caused to seal the upper side of the oil ring groove 31 and scrape off oil from the cylinder wall. The oil, after being scraped, is promptly drained from either of the oil grooves 16 and the radial slots through an oil bore 32 to the inside of the piston 30 from which the oil is finally returned to the crank case. Additional oil passages 33 can be provided in the lower side of the oil ring groove 31 as shown by broken lines in FIG. 3.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A two-piece type oil ring assembly adapted to be mounted in an oil ring groove of a piston disposed within a cylinder, the oil ring groove having a lower side and the oil ring assembly comprising:

a single spacer expander in the form of a split annulus and a single side rail in the form of a flat split annulus, said spacer expander having an upper surface, a lower surface, and a radial section, said radial section forming a substantially L-shaped configuration with a lower surface having substantial portions thereof making plane contact with the lower side of said oil ring groove, an outer crest portion and an inner crest portion, said outer crest portion being closer to the cylinder than said inner crest portion, said outer crest portion having an inner and outer periphery, said inner crest portion being closer to an end of the oil ring groove than said outer crest portion, said inner crest portion having an inner and outer periphery, said outer crest portion and said inner crest portion being integrally connected by a trough portion, said inner crest portion being axially taller than said outer crest portion, said upper and lower surfaces and being formed with a multiplicity of radial slots extending alternatively from the outer periphery of said outer crest portion to the outer periphery of said inner crest portion and from the inner periphery of said inner crest portion to the inner periphery of said outer crest portion, said outer and inner crest portions being substantially axially inflexible, said spacer expander being provided with a plurality of oil grooves radially passing through said spacer expander, at least one of said oil grooves being adjacent to one of said slots, said side rail having a lower surface placed on said outer crest portion and an inner periphery supported by said inner crest portion.

2. The oil ring assembly of claim 1, wherein said spacer expander is integrally formed from steel.

3. The oil ring assembly of claim 1, wherein said outer crest portion has a flat upper surface to support the lower surface of said side rail.

4. The oil ring assembly of claim 1, wherein said inner crest portion has an outer slanting surface facing radially outwardly to support the inner periphery of said side rail.

5. The oil ring assembly of claim 1, wherein said oil grooves are provided on the upper surface of said spacer expander.

6. The oil ring assembly of claim 1, wherein said oil grooves are provided on the lower surface of said spacer expander.

7. The oil ring assembly of claim 1, wherein said oil grooves are provided on the upper and lower surfaces of said spacer expander.

8. The oil ring assembly of claim 1, wherein said piston is provided with a plurality of oil bores radially communicating with said end of said oil ring groove.

* * * * *